June 29, 1954  J. M. SZARKOWSKI  2,682,184
COMBINATION MORSE TAPER SQUARE AND ROUND ADAPTATION SHANK
Filed June 18, 1952

INVENTOR.
Joseph M. Szarkowski

Patented June 29, 1954

2,682,184

UNITED STATES PATENT OFFICE 2,682,184

COMBINATION MORSE TAPER SQUARE AND ROUND ADAPTATION SHANK

Joseph M. Szarkowski, Buchanan, N. Dak.

Application June 18, 1952, Serial No. 294,198

2 Claims. (Cl. 77—71)

The present invention relates to a combination Morse taper square and round adaptation shank and it consists in the combinations, constructions and arrangements of parts herein described and claimed.

Generally there is provided a tool shank which will operate in both chucks which are provided with two opposing jaws and with chucks of the type having three jaws. In the three-jaw type of chuck, the same is generally found upon electric drills and the like where it is desired to hold therein circular shanks instead of the tapered square shanks utilized in the conventional two-jaw type of chuck. The present invention comprises a tool shank having a generally tapered square configuration but provided with three grooves which are at angles of one-hundred twenty degrees with reference to each other so that they may receive therein the jaws of a three-jaw type of chuck while at the same time being capable of use in the two-jaw type of chuck.

It is accordingly an object of the invention to provide a device of the character set forth which is simple in construction, inexpensive to manufacture and yet effective and efficient in use.

Another object of the invention is to provide a novel tool shank having means whereby the same may be clamped in chucks of the two-jaw and chucks of the three-jaw type.

Other and further objects of the invention will become apparent from a reading of the following specification taken in conjunction with the drawing, in which.

Figure 2:
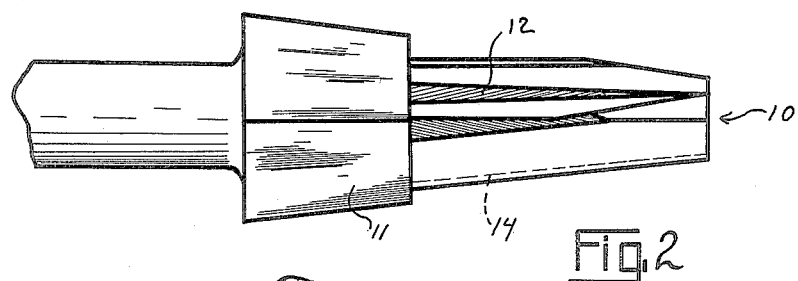
Figure 2 is a side elevational view of Figure 1.
Figure 1:
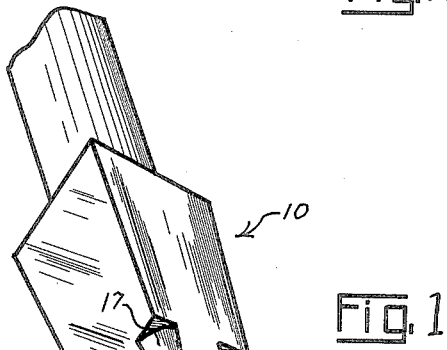
Figure 1 is a fragmentary perspective view of an embodiment of the invention.
Figure 3:
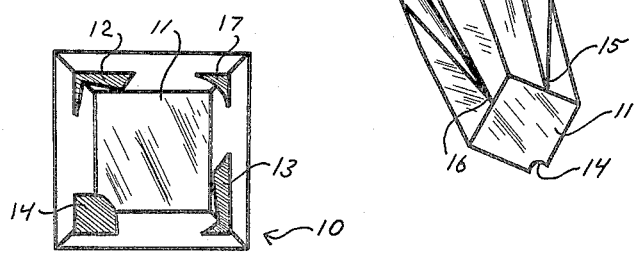
Figure 3 is an end elevational view of the device illustrated in Figures 1 and 2.

Referring more particularly to the drawing, there is shown therein a tool shank generally designated at 10 and having a tapered general contour of general square cross sectional area, as indicated at 11.

That portion of the shank 10 adjacent the inner end thereof is provided with three grooves 12, 13 and 14 which extend inwardly into the shank at angles of 120° with relation to each other. The grooves 12, 13 and 14 extend longitudinally and taper to points, as indicated at 15 and 16 as they reach the inner end of the shank 10. One of the cornered edges of the squared portion of the shank 10 is cut away, as indicated at 17, to accommodate the device to a three-jawed chuck.

In operation, it will be apparent that the squared portion of the device may be readily received in a two-jawed chuck in conventional manner and that there is sufficient squared surface upon the device for such use. It will also be apparent that when it is desired to use the shank 10 in a three-jaw type of chuck, it is only necessary to engage the three jaws of such chuck in the grooves 12, 13 and 14 and that, in such position the shank 10 will be held even more securely than the normally round shank usually received in such three-jaw type of chuck.

While but one form of the invention has been shown and described herein, it will be readily apparent to those skilled in the art that many minor modifications may be made without departing from the spirit of the invention or the scope of the appended claims.

What is claimed is:

1. A device of the character described comprising a shank of tapered form and having a generally square cross sectional area, said shank having three longitudinally extending grooves formed therein, said grooves being positioned in equal distant circumferential relation to each other, and the sides of said grooves converging inwardly and tapering to points at their lower extremities.

2. A device having the structure as described in claim 1, said shank being partially cut away on one of its corners as a means whereby such shank may be received in a three-jaw type of chuck.

References Cited in the file of this patent

UNITED STATES PATENTS

| Number | Name | Date |
|---|---|---|
| 118,178 | Arnold | Aug. 27, 1871 |
| 2,029,447 | Swain | Feb. 4, 1936 |